US012186784B2

(12) United States Patent
Orozco Mariscal et al.

(10) Patent No.: US 12,186,784 B2
(45) Date of Patent: Jan. 7, 2025

(54) METHOD OF CLEANING TRAYS USED FOR HANDLING SEMICONDUCTOR PACKAGES

(71) Applicant: Skyworks Solutions, Inc., Irvine, CA (US)

(72) Inventors: Daniel Orozco Mariscal, Mexicali (MX); Raul Jacobo Cazares, Mexicali (MX); Edgar Antonio Martinez Silva, Mexicali (MX); Josue Roberto Garcia Ayala, Agoura Hills, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 1 day.

(21) Appl. No.: 18/298,588

(22) Filed: Apr. 11, 2023

(65) Prior Publication Data

US 2023/0338996 A1    Oct. 26, 2023

Related U.S. Application Data

(60) Provisional application No. 63/363,370, filed on Apr. 21, 2022, provisional application No. 63/363,364, filed on Apr. 21, 2022.

(51) Int. Cl.
*B08B 5/02* (2006.01)
*B08B 5/04* (2006.01)
(Continued)

(52) U.S. Cl.
CPC .................. *B08B 5/02* (2013.01); *B08B 5/04* (2013.01); *B65G 15/12* (2013.01); *B65G 47/06* (2013.01);
(Continued)

(58) Field of Classification Search
CPC .. B08B 5/02; B08B 5/04; B65G 15/12; B65G 47/06; B65G 47/34; B65G 2201/0258
See application file for complete search history.

(56) References Cited

U.S. PATENT DOCUMENTS 6,026,831 A * 2/2000 Jarvis ...................... B08B 3/022
134/131
2013/0240001 A1* 9/2013 Padtberg ............... A47L 15/241
134/127
(Continued)

FOREIGN PATENT DOCUMENTS

AU    2014274922 B2 * 6/2017 ......... A47L 15/0013
CN    109226080 A  * 1/2019
(Continued)

OTHER PUBLICATIONS

Machine Translation of CN109226080A (Year: 2019).*
Machine Translation of CN109226080 (Year: 2019).*

*Primary Examiner* — Sharidan Carrillo
(74) *Attorney, Agent, or Firm* — Knobbe, Martens, Olson & Bear LLP

(57) ABSTRACT

An automated method of cleaning trays used in handling circuit device packages includes the steps of: placing a plurality of trays on a tray loading station of an automated tray cleaning machine; lowering in an automated manner a first tray of the plurality of trays onto a conveyor; conveying in an automated manner the first tray from the tray loading station into a cleaning chamber; automatically applying pressurized air in the cleaning chamber to one or more surfaces of the first tray to remove debris from the first tray; conveying in an automated manner the first tray out of the cleaning chamber and to a tray unloading station; and raising in an automated manner the first tray above the conveyor.

17 Claims, 10 Drawing Sheets

(51) Int. Cl.
*B65G 15/12* (2006.01)
*B65G 47/06* (2006.01)
*B65G 47/34* (2006.01)

(52) U.S. Cl.
CPC ...... *B65G 47/34* (2013.01); *B65G 2201/0258* (2013.01)

(56) References Cited

U.S. PATENT DOCUMENTS

| | | | | |
|---|---|---|---|---|
| 2014/0034088 | A1* | 2/2014 | Padtberg | A47L 15/241 |
| | | | | 134/131 |
| 2015/0101639 | A1* | 4/2015 | Heppner | A47L 15/4282 |
| | | | | 134/133 |
| 2015/0173585 | A1* | 6/2015 | Disch | A47L 15/4231 |
| | | | | 134/109 |
| 2021/0369077 | A1* | 12/2021 | Schrempp | B25J 15/12 |
| 2023/0338995 | A1* | 10/2023 | Orozco Mariscal | B65G 15/12 |

FOREIGN PATENT DOCUMENTS

| | | | | |
|---|---|---|---|---|
| WO | WO-2012078400 | A2 * | 6/2012 | ............. A47L 15/24 |
| WO | WO-2020163141 | A1 * | 8/2020 | ........... A47L 15/247 |

* cited by examiner

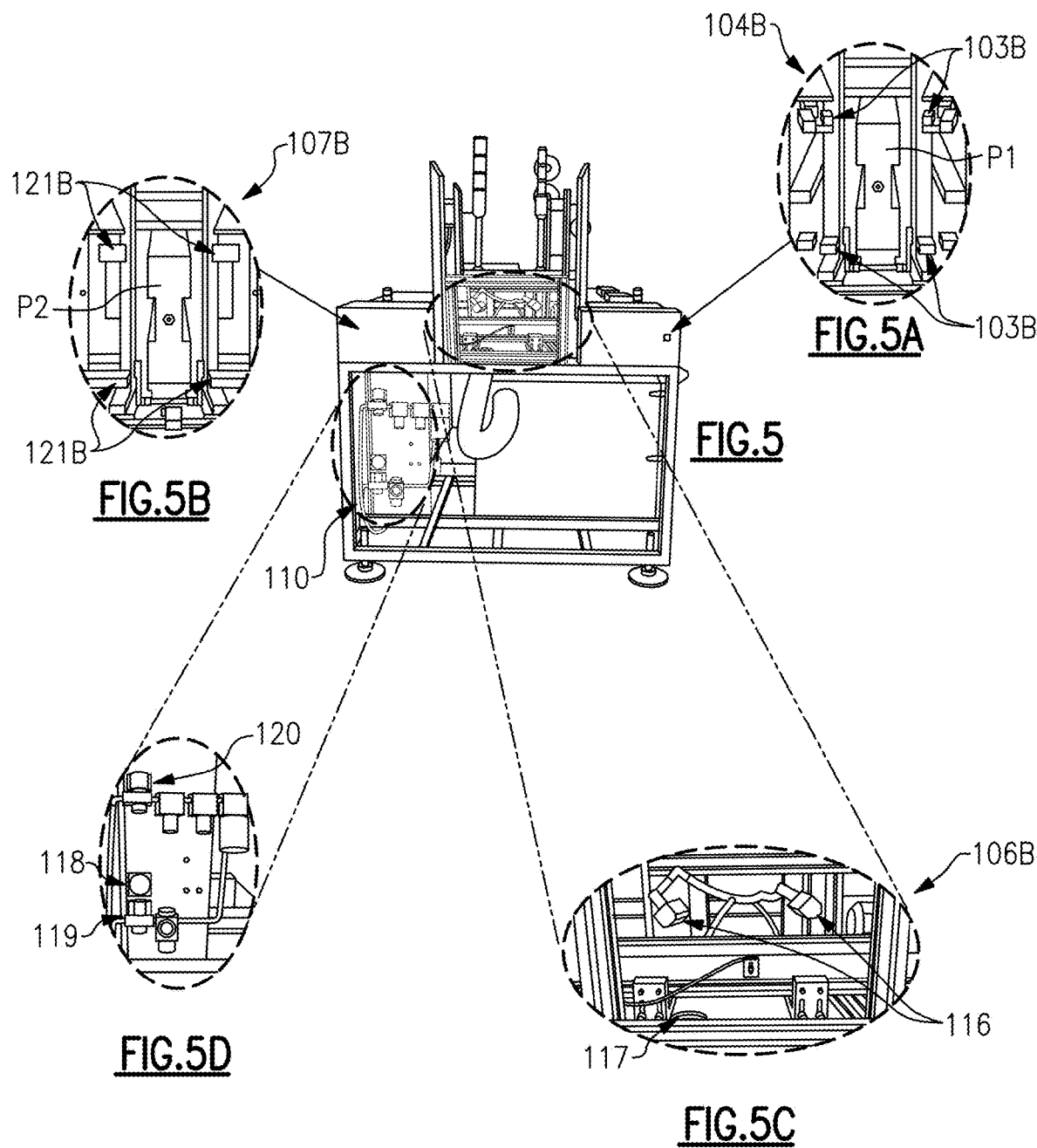

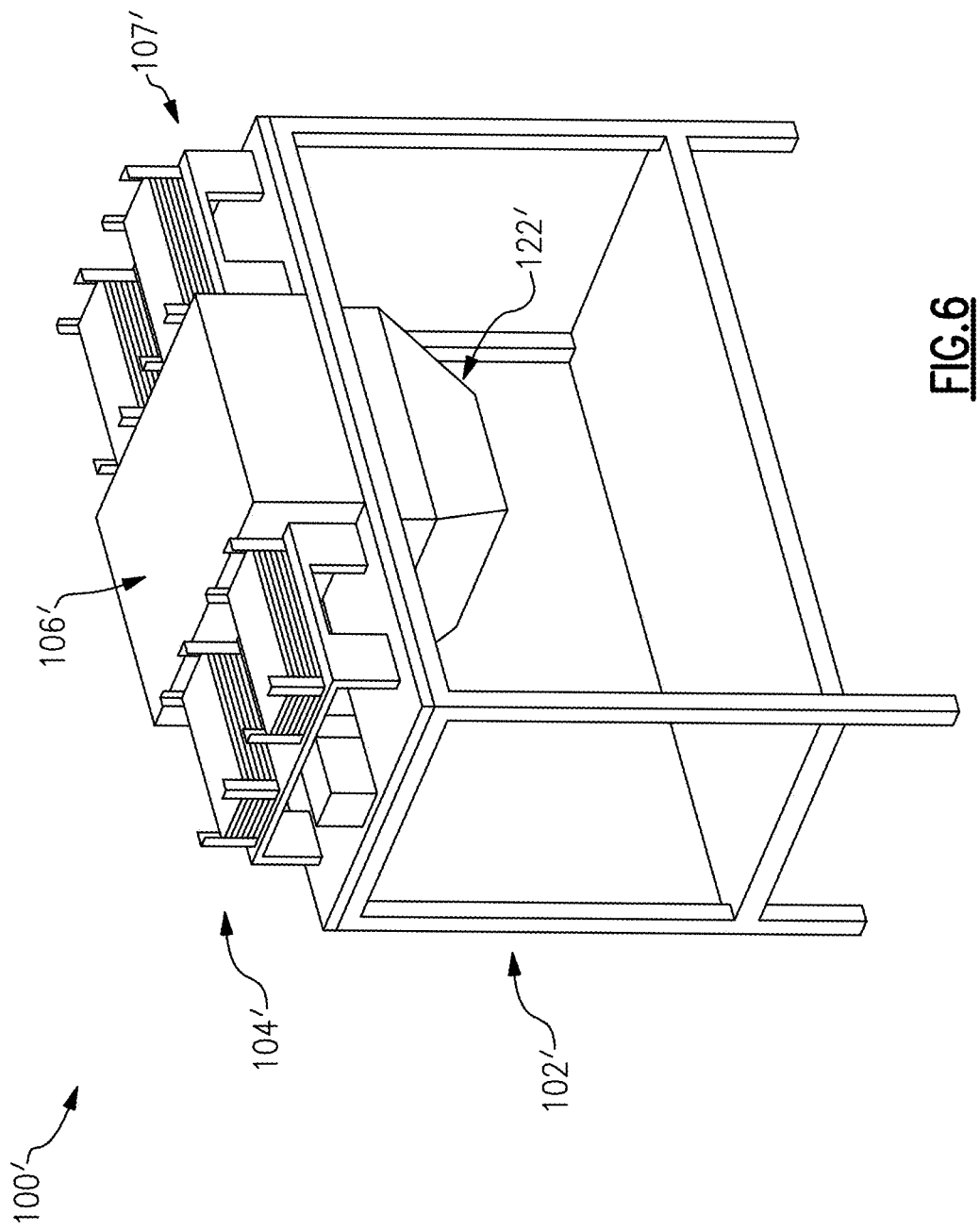

METHOD OF CLEANING TRAYS USED FOR HANDLING SEMICONDUCTOR PACKAGES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of this disclosure relate to circuit device packages, such as radio frequency modules that can be mounted on a circuit board, and more particularly to a method of cleaning trays used in handling circuit device packages.

Description of the Related Art

Trays are used to transport circuit package devices during processing, such as after a shielding step. The trays can become contaminated (e.g., with metal fibers), which can contaminate circuit device packages.

SUMMARY

In accordance with one aspect of the disclosure, an automated system for cleaning trays used in handling circuit device packages is provided.

In accordance with one aspect of the disclosure, an automated system for cleaning trays used in handling circuit device packages is provided. The system cleans multiple trays in a sequential manner with pressurized air in a cleaning chamber, and a vacuum system is operated to remove the contamination (e.g. metal fibers) from the cleaning chamber. The system can handle approximately 30,000 trays per day.

In some aspects, the techniques described herein relate to an automated cleaning system for trays used in handling circuit device packages. The system includes one or more units including a cleaning chamber, one or more nozzles disposed in the cleaning chamber and operable to deliver pressurized air, a tray loading station proximate one end of the cleaning chamber, and a tray unloading station proximate an opposite end of the cleaning chamber. The tray loading station is configured to receive and hold a plurality of trays used in handling circuit device packages, and the tray unloading station is configured to receive and hold a plurality of trays used in handling circuit device packages. The system also includes a conveyor assembly operable to sequentially move each tray of the plurality of trays from the tray loading station, into the cleaning chamber to clean the tray, and out of the cleaning chamber and to the tray unloading station. The one or more nozzles are operable to deliver pressurized air onto the tray while the tray is in the cleaning chamber to remove debris from the tray.

In some aspects, the techniques described herein relate to an automated cleaning system for trays used in handling circuit device packages. The system includes one or more units including a cleaning chamber, a plurality of nozzles disposed in the cleaning chamber and operable to deliver pressurized air, a tray loading station proximate one end of the cleaning chamber and a tray unloading station proximate an opposite end of the cleaning chamber. The tray loading station is configured to receive and hold a plurality of trays used in handling circuit device packages, and the tray unloading station is configured to receive and hold a plurality of trays used in handling circuit device packages. The system also includes a conveyor assembly operable to sequentially move each tray of the plurality of trays from the tray loading station, into the cleaning chamber to clean the tray, and out of the cleaning chamber and to the tray unloading station. The plurality of nozzles are operable to deliver pressurized air onto the tray while the tray is in the cleaning chamber to remove debris from the tray.

In some aspects, the techniques described herein relate to an automated method of cleaning trays used in handling circuit device packages. The method includes the steps of: placing a plurality of trays on a tray loading station of an automated tray cleaning machine; lowering in an automated manner a first tray of the plurality of trays onto a conveyor; conveying in an automated manner the first tray from the tray loading station into a cleaning chamber; automatically applying pressurized air in the cleaning chamber to one or more surfaces of the first tray to remove debris from the first tray; conveying in an automated manner the first tray out of the cleaning chamber and to a tray unloading station; and raising in an automated manner the first tray above the conveyor.

In some aspects, the techniques described herein relate to an automated method of cleaning trays used in handling circuit device packages. The method includes the steps of: placing a plurality of trays on a tray loading station of an automated tray cleaning machine; lowering in an automated manner a first tray of the plurality of trays onto a conveyor; conveying in an automated manner the first tray from the tray loading station into a cleaning chamber; automatically applying pressurized air via a plurality of nozzles in the cleaning chamber to one or more surfaces of the first tray to remove debris from the first tray; conveying in an automated manner the first tray out of the cleaning chamber and to a tray unloading station; and raising in an automated manner the first tray above the conveyor.

BRIEF DESCRIPTION OF THE DRAWINGS

FIG. 5 is a left side view of the automated cleaning system of FIG. 1.

FIG. 5A is a partial top view of a loading zone of the automated cleaning system of FIG. 1.

FIG. 5B is a partial top view of an unloading loading zone of the automated cleaning system of FIG. 1.

FIG. 5C is a partial side view of a cleaning chamber of the automated cleaning system of FIG. 1.

FIG. 5D is a partial view of controls of the automated cleaning system of

FIG. 1.

FIG. 6 is a perspective view of an automated cleaning system for trays used with circuit device packages.

DETAILED DESCRIPTION

Figure 1:
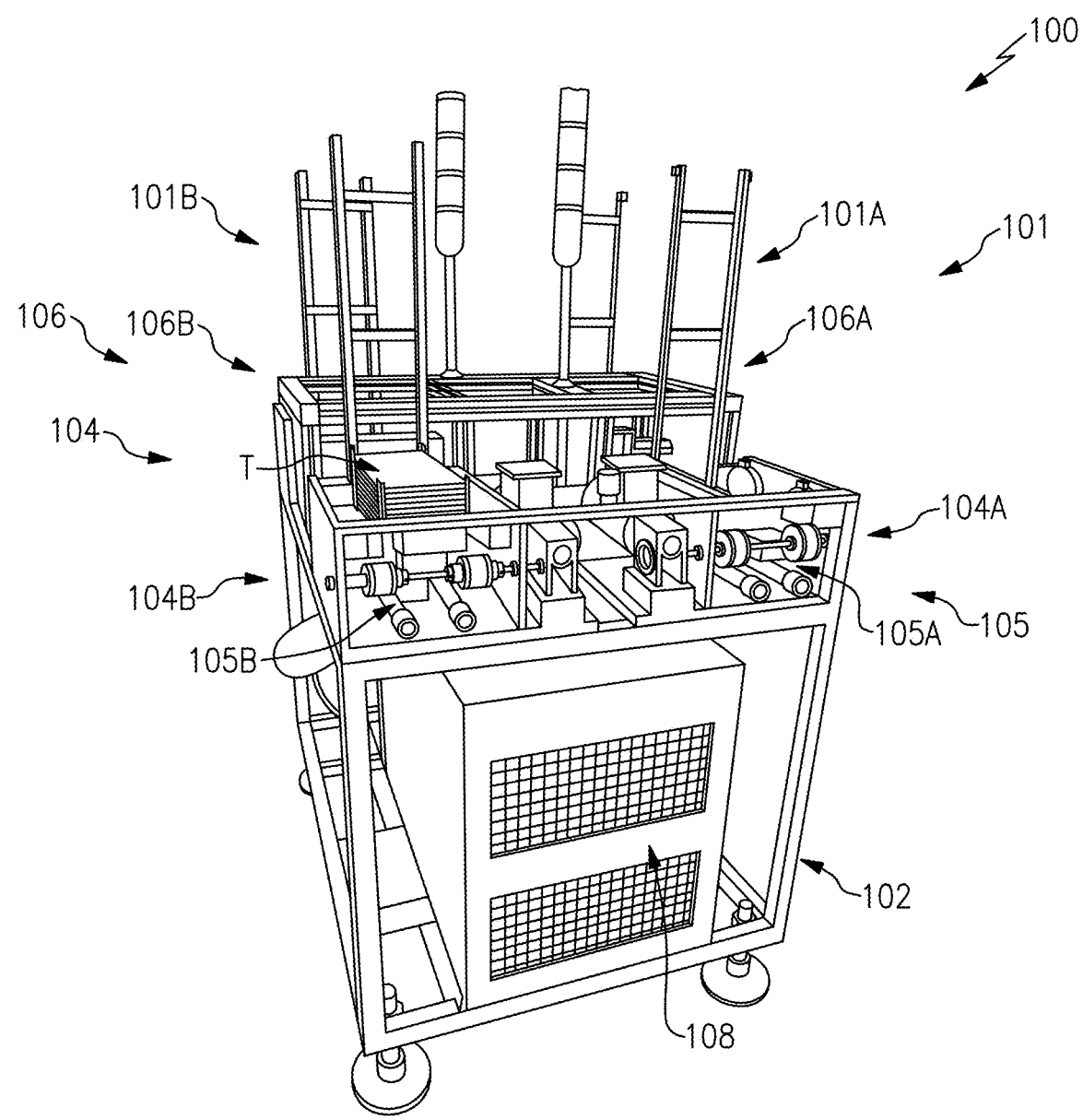
FIG. 1 is a front perspective view of an automated cleaning system for trays used with circuit device packages.
Figure 2:
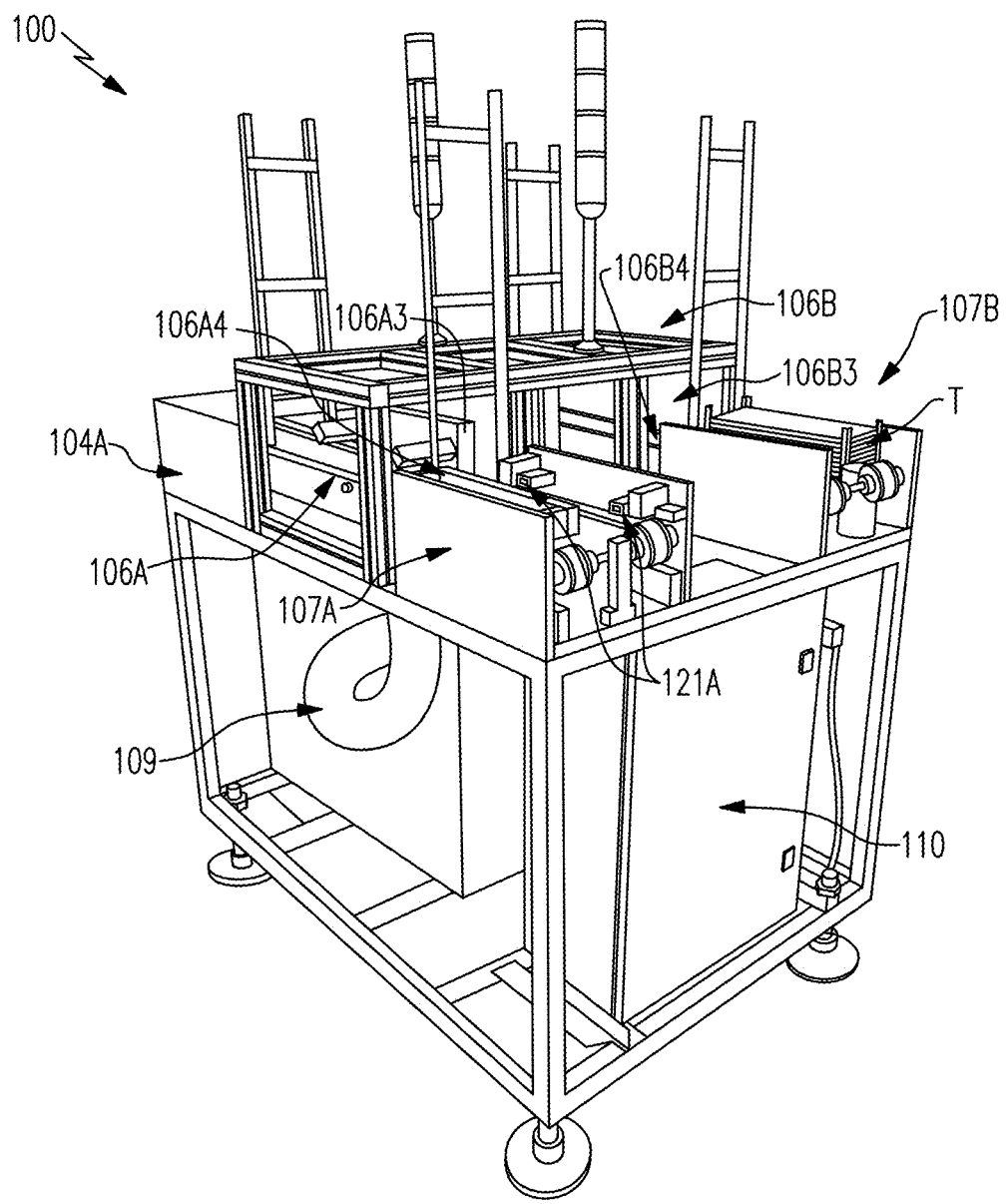
FIG. 2 is a rear perspective view of the automated cleaning system of FIG. 1.
Figure 3:
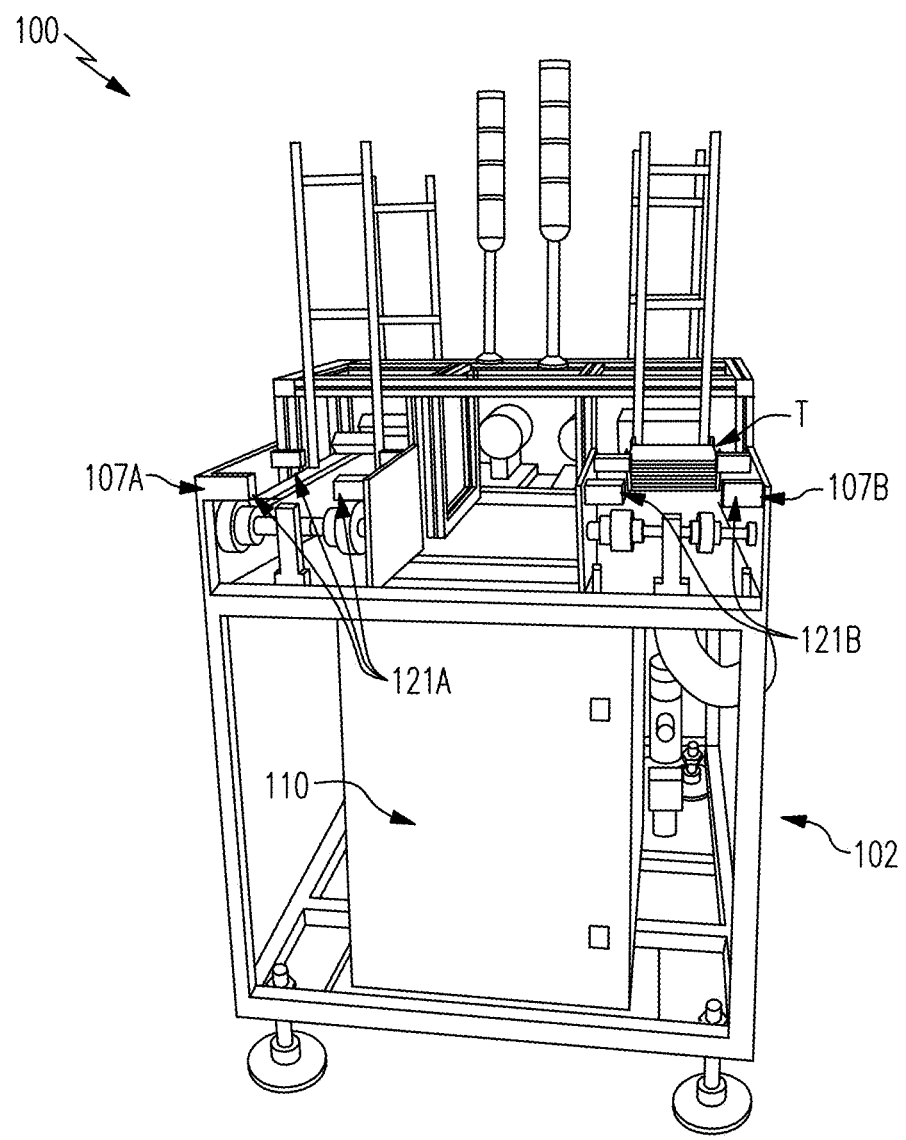
FIG. 3 is a rear view of the automated cleaning system of FIG. 1.

FIGS. 1-5 show an automated cleaning system 100 for trays T used in the handling of circuit device packages (e.g. after a shielding step in the manufacturing of the circuit device packages). The automated cleaning system 100 has one or more units 101 (e.g., cleaning units) attached to a frame 102. In the illustrated implementation, the one or more units 101 are two units attached to the frame 102. However, in other implementations, the one or more units 101 can be more than two units. In another implementation, the one or more units 101 can be a single unit. Advantageously, the automated cleaning system 100 can process (e.g., clean) approximately 30,000 trays per day.

The one or more units 101 has a tray loading station 104, a cleaning chamber 106 and tray unloading station 107. The tray loading station 104, cleaning chamber 106 and tray unloading station 107 are arranged in-line (e.g., extend along the same axis) for each of the one or more units 101. The tray loading station 104 is proximate (e.g., near, adjacent to) one end (e.g., an entrance end) of the cleaning chamber 106 and the tray unloading station 107 is proximate (e.g., near, adjacent to) an opposite end (e.g., an exit end) of the cleaning chamber 106. In the illustrated implementation, the one or more units 101 includes a first unit 101A and a second unit 101B. The first unit 101A has a tray loading station 104A, cleaning chamber 106A and tray unloading station 107A. The second unit 101B has a tray loading station 104B, cleaning chamber 106B and tray unloading station 107B. The tray loading stations 104A, 104B can receive and hold a plurality of trays T in stacked form (e.g., 50 trays each). The tray unloading stations 107A, 107B can receive and hold a plurality of trays T in stacked form (e.g., 50 trays each).

The automated cleaning system 100 also includes a conveyor assembly 105 that convey each tray T of the plurality of trays T from the tray loading station 104 and into the cleaning chamber 106 for cleaning, and from the cleaning chamber 106 to the tray unloading station 107 once the tray T has been cleaned. In the illustrated implementation, the conveyor assembly 105 includes a first conveyor assembly 105A that conveys trays T for unit 101A and a second conveyor assembly 105B that coveys trays T for unit 101B. The first conveyor assembly 105A has a pair of spaced a part conveyor belts 105A1, 105A2 (e.g., closed loop belts) that extend parallel to each other and extend from the tray loading station 104A (e.g., from a proximal end of the tray loading station 104A), through the cleaning chamber 106A and to the tray unloading station 107A (e.g. to a distal end of the tray unloading station 107A). The second conveyor assembly 105B has a pair of spaced a part conveyor belts 105B1, 105B2 (e.g., closed loop belts) that extend parallel to each other and extend from the tray loading station 104B (e.g., from a proximal end of the tray loading station 104B), through the cleaning chamber 106B and to the tray unloading station 107B (e.g. to a distal end of the tray unloading station 107B). The conveyor belts 105A1, 105A2 can extend over one or more pulleys (e.g., gear belt pulleys) that are rotated about an axis perpendicular to the length of the conveyor belts 105A1, 105A2 to translate the conveyor belts 105A1, 105A2 (e.g., horizontally) from the tray loading station 104A, through the cleaning chamber 106A and to the tray unloading station 107A. Similarly, the conveyor belts 105B1, 105B2 can extend over one or more pulleys (e.g., gear belt pulleys) that are rotated about an axis perpendicular to the length of the conveyor belts 105B1, 105B2 to translate the conveyor belts 105B1, 105B2 (e.g., horizontally) from the tray loading station 104B, through the cleaning chamber 106B and to the tray unloading station 107B. The conveyor belts 105A1, 105A2 or 105B1, 105B2 can be operated to translate at a speed of between 0-5 feet/second.

Figure 4:
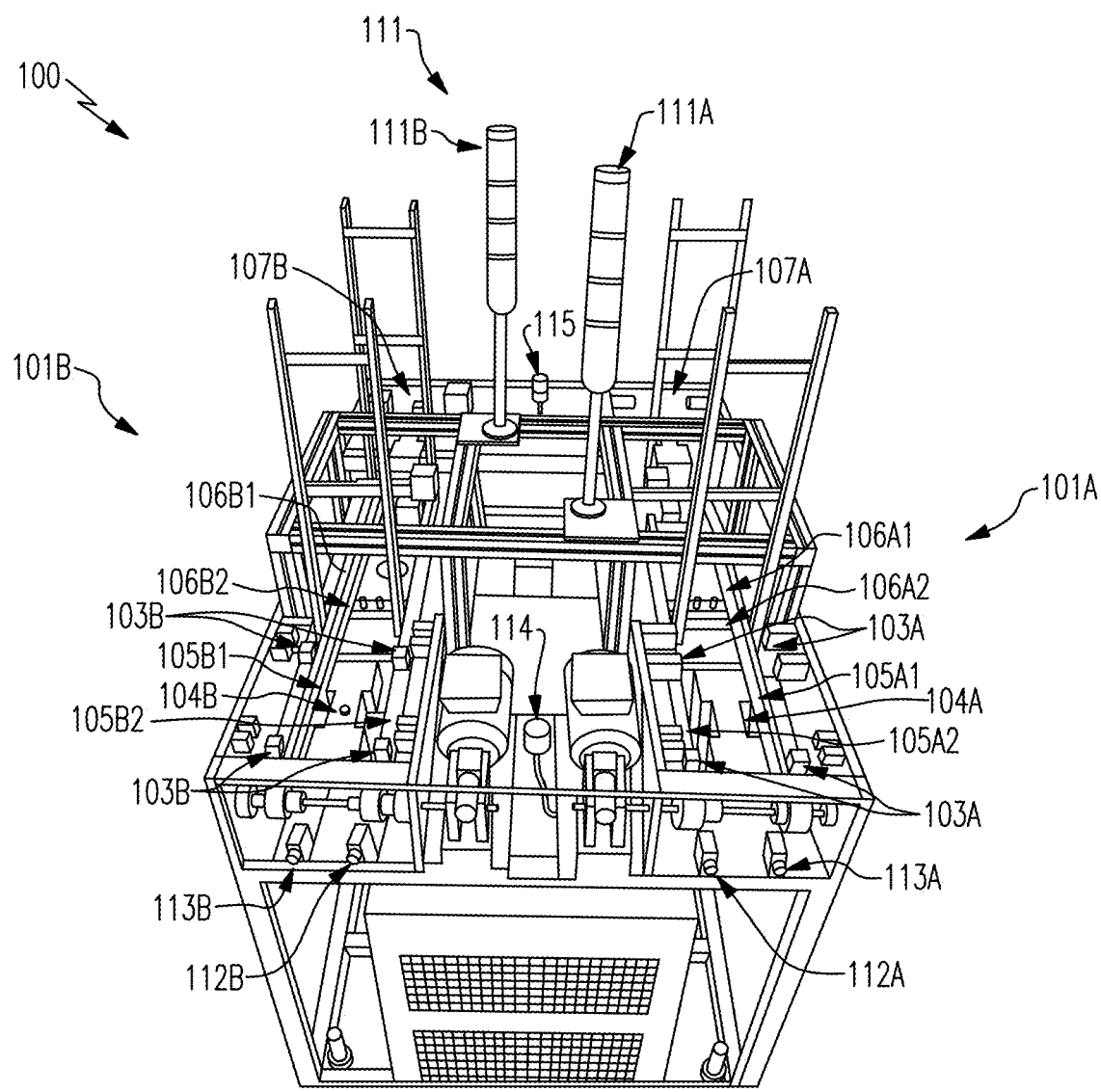
FIG. 4 is a top perspective view of the automated cleaning system of FIG. 1.
Figure 5E:
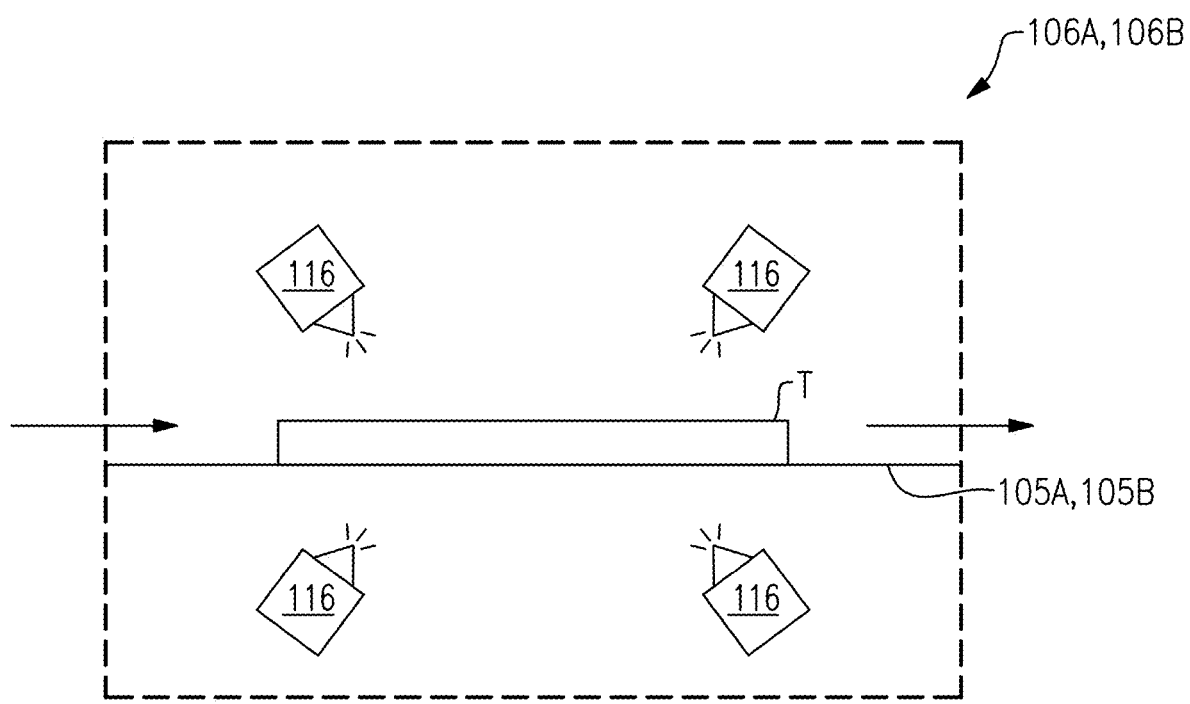
FIG. 5E is a schematic view of a cleaning chamber of the automated cleaning system of FIG. 1, showing the nozzles that direct pressurized air toward the tray to clean the tray.

With reference to FIG. 4, the cleaning chambers 106A, 106B can have a front panel 106A1, 106B1 that defined an opening 106A2, 106B2 over the conveyor belts (e.g., conveyor belts 105A1, 105A2 or 105B1, 105B2) sized to allow a tray T to pass therethrough and into the cleaning chambers 106A, 106B for cleaning. Similarly, the cleaning chambers 106A, 106B can have a rear panel 106A3, 106B3 that defined an opening 106A4, 106B4 over the conveyor belts (e.g., conveyor belts 105A1, 105A2 or 105B1, 105B2) sized to allow a tray T to pass therethrough and out of the cleaning chambers 106A, 106B following the cleaning process.

Each of the tray loading stations 104A, 104B has a support plate P1 (see e.g., FIG. 5A) that supports the trays T placed thereon. The support plate P1 can be actuated (e.g., hydraulically, pneumatically) to move vertically relative to the conveyor belts (e.g., conveyor belts 105A1, 105A2 or 105B1, 105B2) that extend proximate (e.g., near, adjacent) the sides of the support plate P1. The support plate P1 can be actuated (e.g., hydraulically, pneumatically) to move to a first vertical position higher than the vertical position of the conveyor belts (e.g., to hold the trays T above the conveyor belts (e.g., conveyor belts 105A1, 105A2 or 105B1, 105B2) and disallow or prevent contact between the trays T and the conveyor belts (e.g., conveyor belts 105A1, 105A2 or 105B1, 105B2). The support plate P1 can also be actuated (e.g., hydraulically, pneumatically) to move to a second vertical position lower than the first vertical position to allow one of the trays T (e.g., a bottom tray T) to contact the conveyor belts (e.g., conveyor belts 105A1, 105A2 or 105B1, 105B2) to allow the conveyor belts to convey the bottom tray T into the associated cleaning chamber 106A or 106B. The automated cleaning system 100 has actuatable locks 103A and 103B associated with the tray loading stations 104A, 104B, respectively, that can be selectively actuated to engage one of more of the trays T (e.g., above the bottom tray T) to allow the support plate P1 to lower only the bottom tray T onto the conveyor belts so that it can be conveyed to the cleaning chamber 106A, 106B respectively.

Each of the tray unloading stations 107A, 107B has a support plate P2 (see e.g., FIG. 5B) that supports the trays T placed thereon. The support plate P2 can be actuated (e.g., hydraulically, pneumatically) to move vertically relative to the conveyor belts (e.g., conveyor belts 105A1, 105A2 or 105B1, 105B2) that extend proximate (e.g., near, adjacent) the sides of the support plate P2. The support plate P2 can be actuated (e.g., hydraulically, pneumatically) to move to a first vertical position higher than the vertical position of the conveyor belts (e.g., to hold the trays T above the conveyor belts (e.g., conveyor belts 105A1, 105A2 or 105B1, 105B2) and disallow or prevent contact between the trays T and the conveyor belts (e.g., conveyor belts 105A1, 105A2 or 105B1, 105B2). The support plate P2 can also be actuated to move to a second vertical position lower than the first vertical position to allow a tray T conveyed from out of the cleaning chamber 106A or 106B to its associated tray unloading station 107A or 107B to be positioned over the support plate P2, where the support plate P2 can than be actuated to raise said tray T above the conveyor belts (e.g., conveyor belts 105A1, 105A2 or 105B1, 105B2). The automated cleaning system 100 has actuatable locks 121A and 121B associated with the tray unloading stations 107A, 107B, respectively, that can be selectively actuated to engage the one of more of the trays T (e.g., a bottom tray T in a stack of trays T), for example once the support plate P2 has raised the trays T to the vertical level of the locks 121A, 121B, to allow the support plate P2 to then lower to a vertical location relative to the conveyor belts so that it can receive a cleaned tray T conveyed from the cleaning chamber 106A, 106B respectively. Once the support plate P2 receives the cleaned tray T, the support plate P2 can raise said clean tray T so it contacts the rest of the trays T in the stack and the locks 121A, 121B are disengaged.

The automated cleaning system 100 also includes a vacuum unit 108 with a container that receives the debris removed from the cleaning chamber 106, one or more hoses 109 that extend between and fluidly connect the vacuum unit 108 with the cleaning chamber 106 (e.g., with the cleaning chambers 106A, 106B), and a controller 110. The vacuum unit 108 and the controller 110 are mounted on the frame 102.

The automated cleaning system 100 includes one or more nozzles 116 (e.g., fluidly connected to a manifold) in the cleaning chamber 106 (e.g., in the cleaning chambers 106A, 106B). The one or more nozzles 116 can be multiple nozzles 116. For example, the one or more nozzle 116 can include a pair of nozzles 116 in an upper portion of the cleaning chamber 106 and spaced apart from each other and operable to direct pressurized air (e.g., at pressures of 0 to 100 lb/int or psi) onto a first surface (e.g., a top surface) of the tray T while it is in the cleaning chamber 106 to remove debris (e.g., metal filaments) therefrom. In one implementation, pressurized air is applied at 45 psi, which tests showed was effective in removing debris from the trays T. In another implementation the pressurized air is applied at 55 psi, which tests showed was effective in removing debris from the trays T. The one or more nozzles 116 can also include a pair of nozzles 116 in a lower portion of the cleaning chamber 106 and spaced apart from each other and operable to direct pressurized air onto a second surface (e.g., a bottom surface opposite the top surface) of the tray T while it is in the cleaning chamber 106 to remove debris (e.g., metal filaments) therefrom. The vacuum unit 108 can be operated to apply a suction to the cleaning chamber 106 (e.g., to the cleaning chambers 106A, 106B), via an opening 117 (see FIG. 5C) in the cleaning chamber 106 (e.g., opening 117 in each of the cleaning chambers 106A, 106B) to suction the debris (e.g., metal filaments) from the cleaning chamber 106 (via the one or more hoses 109) and into a collection bin (e.g., of the vacuum unit 108). The one or more nozzles 116 (e.g., above and below the tray T) can be angled relative to vertical. The angle can be adjusted between 0-90 degrees relative to vertical. In one example, the one or more nozzles 116 (e.g., above and below the tray T) are angled at approximately 45 degrees relative to horizontal on the top nozzles and 90 degrees on the bottom nozzles in the to allow the nozzles 116 (see FIG. 5E) to direct the pressurized air over the tray T. The one or more nozzles 116 (e.g., above and below the tray T) can be positioned at a distance from the tray T (e.g., from the vertical location of the conveyor belts 105A1, 105A2 or 105B1, 105B2) of between 0-100 mm (e.g., at 100 mm).

With reference to FIG. 4, the automated cleaning system 100 includes one or more indicators 111 (e.g., indicators 111A, 111B for the units 101A, 101B) to indicate the operating state of the one or more units 101 (e.g., indicators 111A, 111B for the units 101A, 101B). The indicators 111A, 111B can have multiple color lights to indicate the operating state of its associated unit 101A, 101B (e.g., green for normal operation, red for malfunction such as tray T being stuck in system, orange for awaiting trays T to be placed at tray loading station). The automated cleaning system 100 also includes stop buttons 112A, 112B operable to stop the operation of the units 101A, 101B, respectively, and initiation buttons 113A, 113B operable to initiate operation of the units 101A, 101B, respectively, and an emergency actuator or button 114 proximate the tray loading stations 104A, 104B and an emergency actuator or button 115 proximate the tray unloading stations 107A, 107B that are each actuatable (separately and independently of each other) to stop the operation of the automated cleaning system 100.

With reference to FIG. 5D, the controller 110 includes a main electrical shutoff 118, a main pneumatic shutoff 120 and a main shutoff for air supply valves for the cleaning chamber 106.

Figure 7:
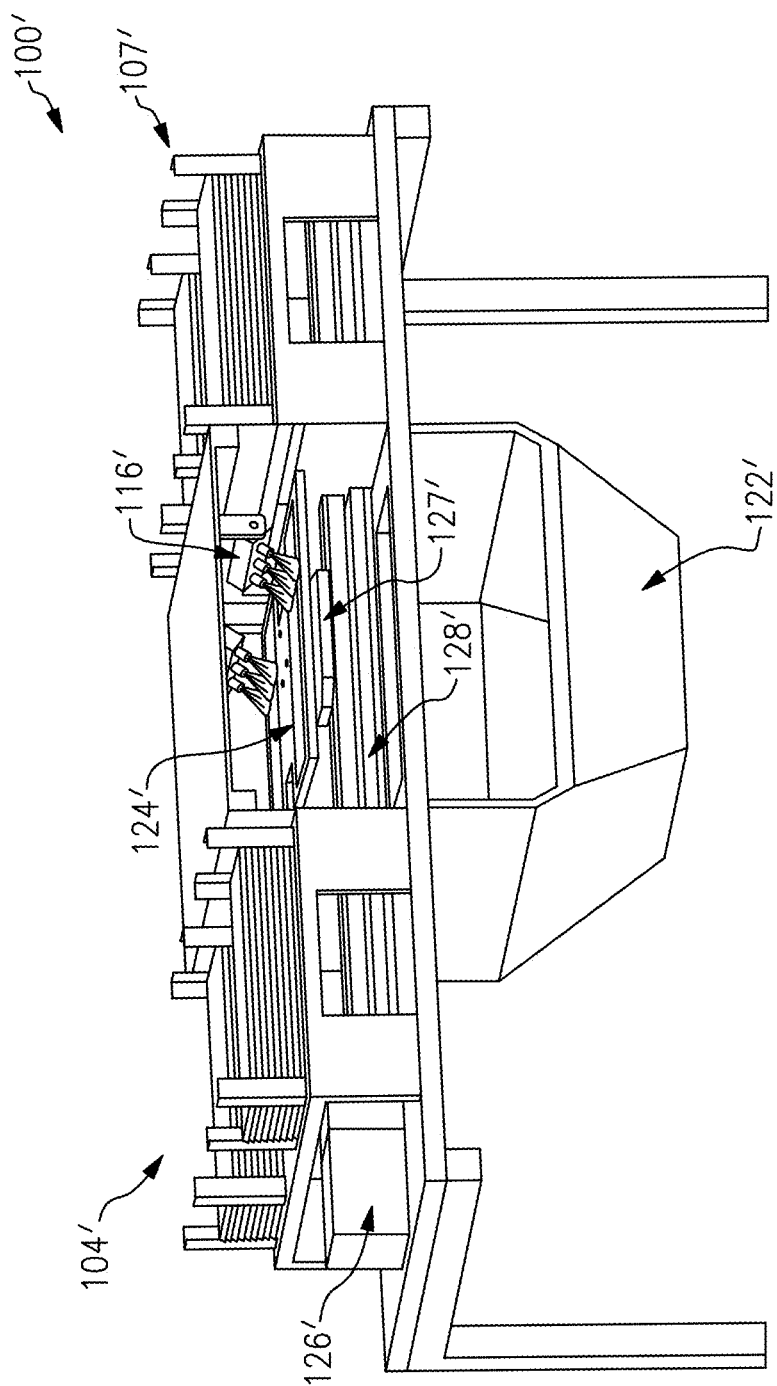
FIG. 7 is a perspective partial cross-sectional view of the automated cleaning system of FIG. 6.

FIG. 6-7 show an automated cleaning system 100' for trays T used in the handling of circuit device packages (e.g. after a shielding step in the manufacturing of the circuit device packages). Some of the features of the automated cleaning system 100' are similar to features of the automated cleaning system 100 in FIGS. 1-5. Thus, reference numerals used to designate the various components of the automated cleaning system 100' are identical to those used for identifying the corresponding components of the automated cleaning system 100 in FIGS. 1-5, except that a "'" has been added to the numerical identifier. Therefore, the structure and description for the various features of the automated cleaning system 100 and how it's operated and controlled in FIGS. 1-5 are understood to also apply to the corresponding features of the automated cleaning system 100' in FIGS. 6-7, except as described below.

The automated cleaning system 100' differs from the automated cleaning system 100 in that the cleaning chamber 106' has a tapered or truncated lower end 122' via which the debris removed from the trays T within the cleaning chamber 106' can be removed. Though not shown, in one implementation, a vacuum unit (similar to the vacuum unit 108) can be fluidly connected to the tapered lower end 122' and apply suction to the cleaning chamber 106' to remove the debris.

With reference to FIG. 7, the automated cleaning system 100' has a conveyor assembly 105' that differs from the conveyor assembly 105 in that it includes a linear actuator 126' (e.g., electric motor that rotates a lead screw) operable to linearly translate a carriage 127' along a rail 128'. The carriage 127' can include or be attached to a tray holder 124'. The tray holder 124' can hold at least one tray T (e.g., hold two trays T). The rail 128' extends from the tray loading station 104' (e.g., from a proximal end of the tray loading station 104'), through the cleaning chamber 106' and to the tray unloading station 107' (e.g., to a distal end of the tray unloading station 107'). The tray holder 124' can receive one or more trays T (e.g., two trays T) at the tray loading station 104', then the linear actuator 126' can be operated to move the tray holder 124' (via the carriage 127') into the cleaning chamber 106' for cleaning (e.g., for application of pressurized air on one or more surfaces of the tray(s) T by the one or more nozzles 116'). Once the cleaning of the trays T is complete, the linear actuator 126' can be operated to move the tray holder 124' (with the trays T thereon) out of the cleaning chamber 106' and to the tray unloading station 107', where the one or more trays T (e.g., two trays T) can be removed from the tray holder 124', after which the tray holder 124' returns to the tray loading station 104' to again receive one or more trays T.

Though not shown, the automated cleaning system 100' can have one or more actuatable locks (e.g., similar to the actuatable locks 103A and 103B) associated with the tray loading station 104 that can be selectively actuated to engage one of more of the trays T (e.g., above a bottom tray T) to allow the tray holder 124' to receive only the bottom tray T (e.g., allow the bottom tray T to drop from the stack of trays T) so that it can be conveyed to the cleaning chamber 106', while the remaining trays T remain at the tray loading station 104'. Alternatively or additionally, the tray holder 124' can be actuated (e.g., hydraulically, pneumatically) into a higher vertical position to engage the bottom tray T, and then actuated into a lower vertical position to then convey the tray T toward the cleaning chamber 106'. Similarly, the automated cleaning system 100' can have one or more actuatable locks (e.g., similar to the actuatable locks 121A and 121B) associated with the tray unloading station 107' that can be selectively actuated to engage the one of more of the trays T (e.g., a bottom tray T in a stack of trays T), for example once the tray holder 124' has moved the cleaned tray(s) T to the tray unloading station 107' (e.g., can raise the cleaned tray T off the tray holder 124'). Alternatively or additionally, the tray holder 124' can be actuated (e.g., hydraulically, pneumatically) into a higher vertical position so that the cleaned tray T engages the stack of clean trays T at the tray unloading station 107', and the one or more locks actuated to lock the stack of trays T in place, after which the tray holder 124' can be moved to a lower vertical position to allow the tray holder 124' to move back to the tray loading station 104' (e.g., to receive another tray T to be cleaned).

Figure 8:
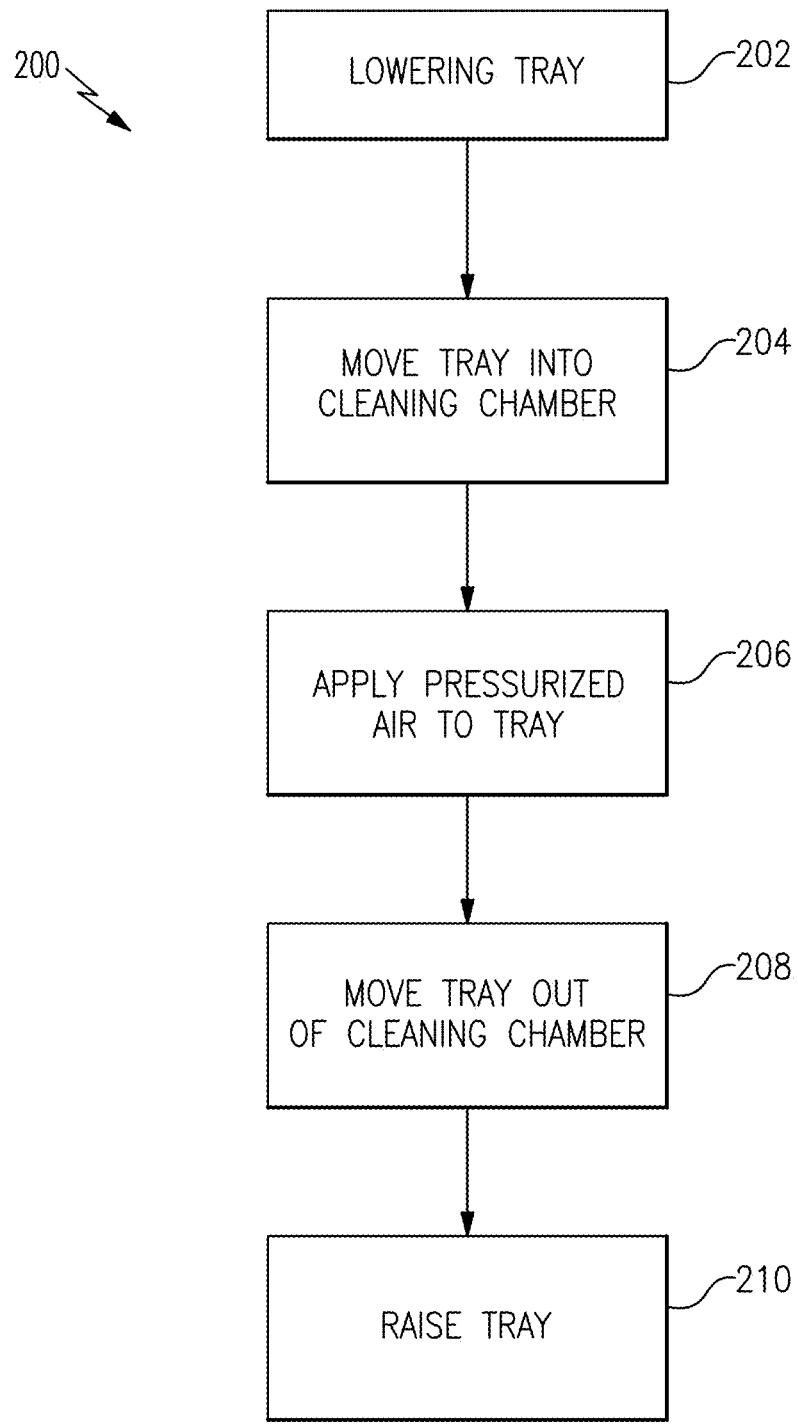
FIG. 8 shows steps in a process for cleaning trays used with circuit device packages with an automated cleaning system.

FIG. 8 shows a process or method 200 of cleaning one or more trays T used in handling circuit device packages (e.g., utilizing the automated cleaning system 100 or automated cleaning system 100'). The method 200 includes the step of lowering a tray T 202 (e.g., in a stack of trays T), for example in an automated manner. In one implementation, the tray is lowered via a platform that supports the tray, the platformed moved vertically (e.g., hydraulically or pneumatically). The method 200 also includes the step of moving or conveying the tray T into the cleaning chamber 204, for example in an automated manner. In one implementation, the tray is moved (e.g., translated) via a PLC (Programmable Logic Controller) actuation of one or more motors that translate one or more conveyor belts. In another implementation, the tray T is moved in an automated manner via a carriage that moves along a rail and is driven by a linear actuator. The method 200 also includes the step of applying pressurized air 206 to the tray T in the cleaning chamber, for example in an automated manner. In one implementation, the pressurized air is applied via-a PLC (Programmable Logic Controller) actuation of one or more valves in a pressurized air system to deliver pressurized air via one or more nozzles in the cleaning chamber that direct pressurized air onto the tray T. In one implementation, the pressurized air is directed to one or more surfaces (e.g., a top surface and/or a bottom surface) of the tray T to remove debris (e.g., metal filaments) from the tray T. Optionally, the removed debris can be removed (e.g., suctioned), in an automated manner, from the cleaning chamber (e.g., with a-PLC (Programmable Logic Controller) vacuum unit in fluid communication with the cleaning chamber). The method 200 also includes the step of moving or conveying the tray T out of the cleaning chamber 208 (e.g., via conveyor belts or a linear actuator), for example in an automated manner. In one implementation, the tray is moved (e.g., translated) via a PLC (Programmable Logic Controller) actuation of one or more motors that translate one or more conveyor belts or via a carriage that moves along a rail and driven by a linear actuator. The method 200 further includes the step of raising the cleaned tray T (e.g., into contact with a stack of trays T), for example in an automated manner. In one implementation, the tray is raised via a platform that supports the tray, the platformed moved vertically (e.g., hydraulically or pneumatically) under computer control.

Figure 9:
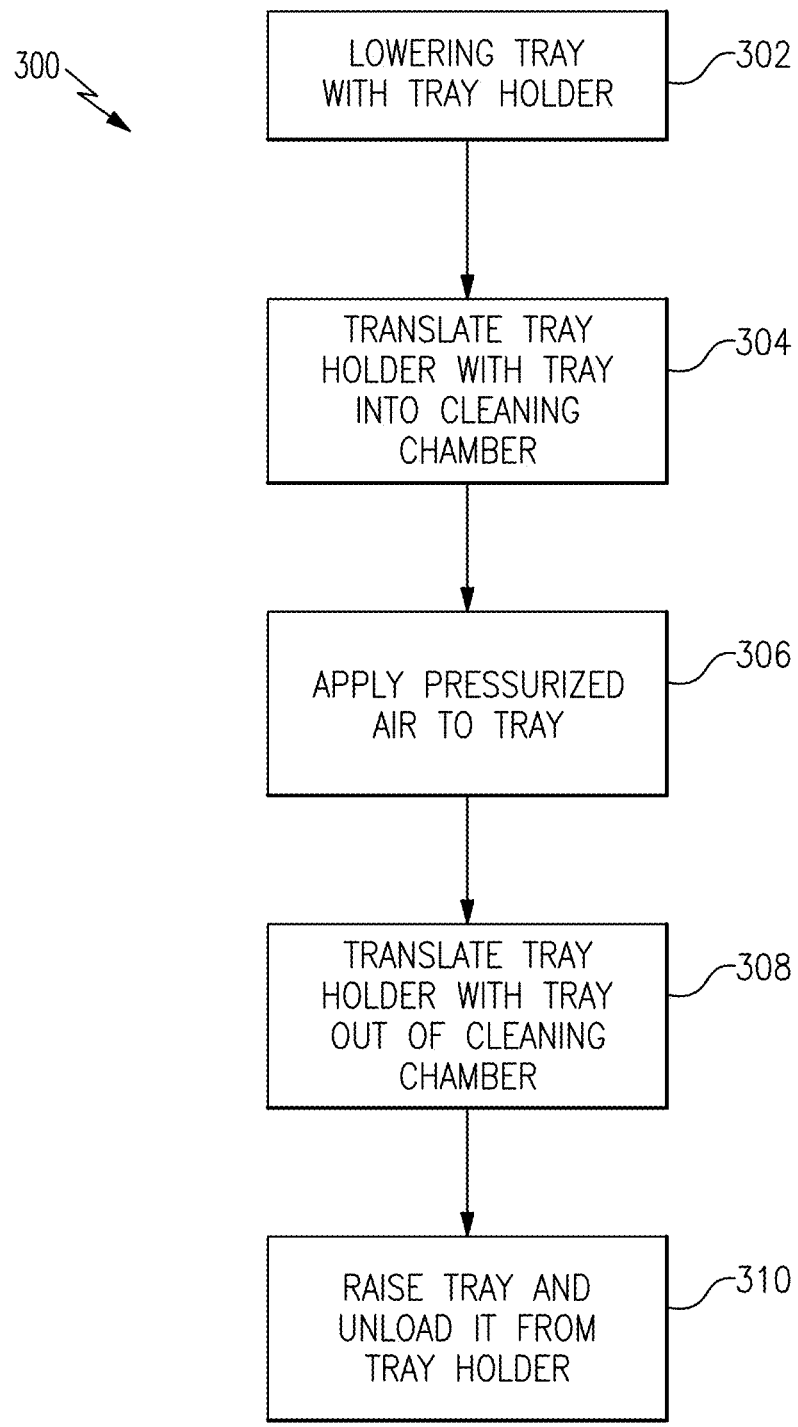
FIG. 9 shows steps in a process for cleaning trays used with circuit device packages with an automated cleaning system.

FIG. 9 shows a process or method 300 of cleaning one or more trays T used in handling circuit device packages (e.g., utilizing the automated cleaning system 100 or automated cleaning system 100'). The method 300 includes the step of lowering a tray T 302 (e.g., in a stack of trays T) with a tray holder, for example in an automated manner. In one implementation, the tray holder is lowered hydraulically or pneumatically, in an automated manner, under computer control. The method 300 also includes the step of moving or conveying (e.g., translating) the tray holder (with the tray(s) T thereon) into the cleaning chamber 304, for example in an automated manner. In one implementation, the tray holder is moved (e.g., translated) via a PLC (Programmable Logic Controller) actuation of one or more motors that translate a carriage that moves along a rail and is driven by a linear actuator. The method 300 also includes the step of applying pressurized air 306 to the tray T in the cleaning chamber, for example in an automated manner. In one implementation, the pressurized air is applied via a PLC (Programmable Logic Controller) actuation of one or more valves in a pressurized air system to deliver pressurized air via one or more nozzles in the cleaning chamber that direct pressurized air onto the tray T. In one implementation, the pressurized air is directed to one or more surfaces (e.g., a top surface and/or a bottom surface) of the tray T to remove debris (e.g., metal filaments) from the tray T. Optionally, the removed debris can be removed (e.g., suctioned), in an automated manner, from the cleaning chamber (e.g., with a PLC (Programmable Logic Controller) vacuum unit in fluid communication with the cleaning chamber). The method 300 also includes the step of moving the tray holder (with the cleaned tray(s) T thereon) out of the cleaning chamber 308 (e.g., via the linear actuator), for example in an automated manner. In one implementation, the tray holder is moved (e.g., translated) via a PLC (Programmable Logic Controller) actuation of one or more motors that translate a carriage that moves along a rail and driven by a linear actuator. The method 300 further includes the step of raising the tray holder and unloading the cleaned tray, for example in an automated manner. In one implementation, the tray is raised hydraulically or pneumatically under a PLC (Programmable Logic Controller).

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure.

The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. An automated method of cleaning trays used in handling circuit device packages, comprising:
    placing a plurality of trays on a tray loading station of an automated tray cleaning machine;
    vertically lowering in an automated manner a first tray of the plurality of trays onto a pair of spaced apart conveyor belts while supported on a first support plate that moves vertically relative to the pair while a remainder of the plurality of trays are maintained vertically spaced above the first tray, the first support plate being lowered between the pair to allow the first tray to contact the pair;
    conveying in an automated manner the first tray from the tray loading station into a cleaning chamber with the pair;
    automatically applying pressurized air in the cleaning chamber to one or more surfaces of the first tray to remove debris from the first tray;
    conveying in an automated manner the first tray out of the cleaning chamber and to a tray unloading station with the pair; and
    raising in an automated manner the first tray above the pair with a second support plate of the tray unloading station that moves vertically relative to the pair while the second support plate is disposed between the pair and vertically positioned relative to the pair to allow the first tray to be conveyed over the second support plate, which vertically raises the first tray off the pair.

2. The method of claim 1 wherein applying pressurized air in the cleaning chamber includes operating one or more nozzles to deliver pressurized air to the one or more surfaces of the first tray.

3. The method of claim 1 further including operating a vacuum system to suction the removed debris from the cleaning chamber and into a collection bin.

4. The method of claim 1 wherein the tray unloading station is operable to stack the plurality of trays once they pass through the cleaning chamber.

5. The method of claim 1 wherein the pair of spaced apart conveyor belts extend parallel to each other.

6. The method of claim 1 wherein the tray loading station is a pair of tray loading stations, the cleaning chamber is a pair of cleaning chambers, and the tray unloading station is a pair of tray unloading stations, each of the tray loading stations disposed in line with one of the cleaning chambers and one of the tray unloading stations.

7. The method of claim 2 wherein operating the one or more nozzles includes operating at least one of a plurality of nozzles in the cleaning chamber, the at least one of the plurality of nozzles operable to deliver pressurized air over a top surface of the first tray, at least one of the plurality of nozzles operable to deliver pressurized air over a bottom surface of the first tray.

8. The method of claim 5 wherein, the pair of spaced apart conveyor belts are disposed proximate opposite sides of the first support plate.

9. The method of claim 5 wherein, the pair of spaced apart conveyor belts are disposed proximate opposite sides of the second support plate.

10. An automated method of cleaning trays used in handling circuit device packages, comprising:
    placing a plurality of trays on a tray loading station of an automated tray cleaning machine;
    vertically lowering in an automated manner a first tray of the plurality of trays onto a pair of spaced apart conveyor belts while supported on a first support plate that moves vertically relative to the pair while a remainder of the plurality of trays are maintained vertically spaced above the first tray, the first support plate being lowered between the pair to allow the first tray to contact the pair;
    conveying in an automated manner the first tray from the tray loading station into a cleaning chamber with the pair;
    automatically applying pressurized air via a plurality of nozzles in the cleaning chamber to one or more surfaces of the first tray to remove debris from the first tray;
    conveying in an automated manner the first tray out of the cleaning chamber and to a tray unloading station with the pair; and
    raising in an automated manner the first tray above the pair with a second support plate of the tray unloading station that moves vertically relative to the pair while the second support plate is disposed between the pair and vertically positioned relative to the pair to allow the first tray to be conveyed over the second support plate, which vertically raises the first tray off the pair.

11. The method of claim 10 wherein the plurality of nozzles in the cleaning chamber include at least one nozzle operable to deliver pressurized air over a top surface of the first tray and at least one nozzle operable to deliver pressurized air over a bottom surface of the first tray.

12. The method of claim 10 further including applying suction in the cleaning chamber to suction the removed debris from the cleaning chamber.

13. The method of claim 10 wherein the tray unloading station is operable to stack the plurality of trays once they pass through the cleaning chamber.

14. The method of claim 10 wherein the pair of spaced apart conveyor belts extend parallel to each other.

15. The method of claim 10 wherein the tray loading station is a pair of tray loading stations, the cleaning chamber is a pair of cleaning chambers, and the tray unloading station is a pair of tray unloading stations, each of the tray loading stations disposed in line with one of the cleaning chambers and one of the tray unloading stations.

16. The method of claim 14 wherein the pair of spaced apart conveyor belts are disposed proximate opposite sides of the first support plate.

17. The method of claim 14 wherein the pair of spaced apart conveyor belts are disposed proximate opposite sides of the second support plate.

* * * * *